United States Patent
Jo et al.

(10) Patent No.: US 12,315,922 B2
(45) Date of Patent: May 27, 2025

(54) POSITIVE ELECTRODE ACTIVE MATERIAL AND METHOD FOR PREPARING THE SAME

(71) Applicants: LG Chem, Ltd., Seoul (KR); The Regents of the University of California, Oakland, CA (US)

(72) Inventors: Chi Ho Jo, Daejeon (KR); Wang Mo Jung, Daejeon (KR); Hyeseung Chung, La Jolla, CA (US); Ying Shirley Meng, La Jolla, CA (US)

(73) Assignees: The Regents of the University of California, Oakland, CA (US); LG Energy Solution, Ltd., Seoul (KR)

( * ) Notice: Subject to any disclaimer, the term of this patent is extended or adjusted under 35 U.S.C. 154(b) by 791 days.

(21) Appl. No.: 16/988,024

(22) Filed: Aug. 7, 2020

(65) Prior Publication Data
US 2022/0045320 A1 Feb. 10, 2022

(30) Foreign Application Priority Data

Aug. 7, 2020 (KR) .......... 10-2020-0098939

(51) Int. Cl.
H01M 4/525 (2010.01)
H01M 4/02 (2006.01)
H01M 4/36 (2006.01)
H01M 4/505 (2010.01)
H01M 10/0525 (2010.01)

(52) U.S. Cl.
CPC ........... *H01M 4/525* (2013.01); *H01M 4/366* (2013.01); *H01M 4/505* (2013.01); *H01M 10/0525* (2013.01); *H01M 2004/028* (2013.01)

(58) Field of Classification Search
CPC ...... H01M 4/525; H01M 4/366; H01M 4/505; H01M 10/0525; H01M 2004/028; H01M 4/0471; Y02E 60/10
See application file for complete search history.

(56) References Cited

U.S. PATENT DOCUMENTS

| | | | | |
|---|---|---|---|---|
| 9,923,239 B2 * | 3/2018 | Azami | ............. | H01M 10/0567 |
| 2013/0202966 A1 * | 8/2013 | Yu | .......... | H01M 4/505 |
| | | | | 429/223 |
| 2015/0228969 A1 * | 8/2015 | Cho | ...... | H01M 4/366 |
| | | | | 429/223 |
| 2016/0260965 A1 * | 9/2016 | Wu | ........ | H01M 4/366 |
| 2016/0276664 A1 * | 9/2016 | Gunji | ........ | H01M 50/44 |
| 2018/0053940 A1 * | 2/2018 | Jo | ........ | H01M 4/0471 |
| 2019/0006669 A1 * | 1/2019 | Park | ...... | H01M 4/505 |

FOREIGN PATENT DOCUMENTS

| CN | 110165193 A | * | 8/2019 | ............ B82Y 30/00 |
|---|---|---|---|---|
| EP | 3678233 A1 | * | 7/2020 | ......... H01M 10/052 |
| KR | 20120118341 A | | 10/2012 | |
| KR | 20140139675 A | * | 12/2014 | |
| KR | 20170081799 A | | 7/2017 | |
| KR | 20190037119 A | | 4/2019 | |
| KR | 20190057951 A | | 5/2019 | |
| KR | 20190091155 A | * | 8/2019 | |

OTHER PUBLICATIONS

KR20140139675A modified translation as taught by Jo et al (Year: 2014).*
KR20190091155A, English translation as taught by Kim et al. (Year: 2019).*
Machine translation of CN 110165193 A, published on Aug. 23, 2019 (Year: 2019).*
Lu, X., Li, X., Wang, Z., Guo, H., Yan, G., Yin, X.—A modified co-precipitation process to coat LiNi1/3Co1/3Mn1/3O2 onto LiNi0.8Co0.1Mn0.1O2 for improving the electrochemical performance, Applied Surface Science, 297 (2014), pp. 182-187 (Year: 2014).*
Chung, et al., "Comprehensive study of a versatile polyol synthesis approach for cathode materials for Li-ion batteries," Nano Research, Aug. 8, 2019, pp. 2238-2249, vol. 12, No. 9.

* cited by examiner

*Primary Examiner* — Anca Eoff
(74) *Attorney, Agent, or Firm* — Lerner David LLP

(57) ABSTRACT

A method for preparing a positive electrode active material and a positive electrode active material prepared thereby are provided. The method includes a first step of reacting a coating precursor preparation solution including a metal solution containing metal ions included in a coating layer and a chelating agent to prepare a coating precursor, which is a complex in which the metal ions and the chelating agent are combined, and a second step of dry-mixing particles having a specific composition and the coating precursor, followed by firing the mixture to form a coating layer having a specific composition on surfaces of the particles.

15 Claims, 9 Drawing Sheets

POSITIVE ELECTRODE ACTIVE MATERIAL AND METHOD FOR PREPARING THE SAME

CROSS-REFERENCE TO RELATED APPLICATIONS

This application claims the benefit first 10-2020-0098939, filed on Aug. 7, 2020, in the Korean Intellectual Property Office, the disclosure of which is incorporated herein in its entirety by reference.

TECHNICAL FIELD

Technical Field

The present invention relates to a positive electrode active material and a method for preparing the same.

Background Art

As technology development and demand for mobile devices and electric vehicles have increased, the demand for secondary batteries as an energy source has been rapidly increased. Among secondary batteries, lithium secondary batteries which have a high energy density and voltage, a long cycle life, and a low self-discharging rate have been commercialized and widely used.

As a positive electrode active material of a lithium secondary battery, a lithium transition metal oxide is used. Among such lithium transition metal oxides, a lithium-cobalt-based composite metal oxide, such as $LiCoO_2$, which has a high functional voltage and excellent capacity properties has been mainly used. However, $LiCoO_2$ has a problem in that the crystal structure becomes unstable when lithium is de-intercalated by 62% or more, and the surface stability is deteriorated according to an oxidation reaction on the surface thereof.

Meanwhile, recently, as the demand for secondary batteries having a high energy density increases, lithium-nickel-based transition metal oxides having a high nickel content are being developed to increase the capacity of positive electrode active materials. Even in the case of a lithium-nickel-based transition metal oxide having a high nickel content, the oxidation amount of nickel increases in the same voltage range due to the high nickel content, and thus, a large number of lithium ions are moved, thereby deteriorating the structural stability of a positive electrode active material.

Therefore, there has been a demand for developing a positive electrode active material having excellent structural stability.

DISCLOSURE OF THE INVENTION

Technical Problem

An aspect of the present invention provides a positive electrode active material with an improved structural stability, and thus, is capable of improving various properties of a battery when applied thereto, and a method for preparing the same.

Technical Solution

According to an aspect of the present invention, there is provided a method for preparing a positive electrode active material, wherein the method includes a first step of reacting a coating precursor preparation solution including a metal solution containing metal ions included in a coating layer and a chelating agent to prepare a coating precursor, which is a complex in which the metal ions and the chelating agent are combined, and a second step of dry-mixing particles having the composition of Formula 1 or Formula 2 below and the coating precursor, followed by firing the mixture to form a coating layer having the composition of Formula 3 below on surfaces of the particles.

$$Li[Co_{1-a}M^1_a]O_2 \qquad \text{[Formula 1]}$$

In Formula 1 above, $M^1$ may be one or more selected from the group consisting of B, Mg, Ca, Al, Ti, V, Cr, Fe, Zn, Ga, Y, Zr, Nb, Mo, Ta, and W, and $0 \leq a < 0.1$.

$$Li[Ni_b Co_c Mn_d M^2_e]O_2 \qquad \text{[Formula 2]}$$

In Formula 2 above, $M^2$ may be one or more selected from the group consisting of B, Mg, Ca, Al, Ti, V, Cr, Fe, Zn, Ga, Y, Zr, Nb, Mo, Ta, and W, and $0.8 \leq b < 1$, $0 < c < 0.2$, $0 < d < 0.2$, $0 \leq e < 0.1$, and $b+c+d+e=1$.

$$Li[Ni_f Co_g Mn_h M^3_i]O_2 \qquad \text{[Formula 3]}$$

In Formula 3 above, $M^3$ may be one or more selected from the group consisting of B, Mg, Ca, Al, Ti, V, Cr, Fe, Zn, Ga, Y, Zr, Nb, Mo, Ta, and W, and $0 < f \leq 0.4$, $0 \leq g \leq 0.6$, $0 \leq h \leq 0.6$, $0 \leq i < 0.1$, and $f+g+h+i=1$.

According to another aspect of the present invention, there is provided, there is provided a positive electrode active material including particles having the composition of Formula 1 or Formula 2 below and a coating layer formed on surfaces of the particles and having the composition of Formula 3 below.

$$Li[Co_{1-a}M^1_a]O_2 \qquad \text{[Formula 1]}$$

In Formula 1 above, $M^1$ may be one or more selected from the group consisting of B, Mg, Ca, Al, Ti, V, Cr, Fe, Zn, Ga, Y, Zr, Nb, Mo, Ta, and W, and $0 \leq a < 0.1$.

$$Li[Ni_b Co_c Mn_d M^2_e]O_2 \qquad \text{[Formula 2]}$$

In Formula 2 above, $M^2$ may be one or more selected from the group consisting of B, Mg, Ca, Al, Ti, V, Cr, Fe, Zn, Ga, Y, Zr, Nb, Mo, Ta, and W, and $0.8 \leq b < 1$, $0 < c < 0.2$, $0 < d < 0.2$, $0 \leq e < 0.1$, and $b+c+d+e=1$.

$$Li[Ni_f Co_g Mn_h M^3_i]O_2 \qquad \text{[Formula 3]}$$

In Formula 3 above, $M^3$ may be one or more selected from the group consisting of B, Mg, Ca, Al, Ti, V, Cr, Fe, Zn, Ga, Y, Zr, Nb, Mo, Ta, and W, and $0 < f \leq 0.4$, $0 \leq g \leq 0.6$, $0 \leq h \leq 0.6$, $0 \leq i < 0.1$, and $f+g+h+i=1$.

According to yet another aspect of the present invention, there are provided a positive electrode for a lithium secondary battery, the positive electrode including the positive electrode active material according to the present invention, and a lithium secondary battery including the positive electrode for a lithium secondary battery.

Advantageous Effects

According to a preparation method of the present invention, by using a coating precursor which is a complex in which metal ions and a chelating agent are combined, it is possible to uniformly form a coating layer even when drying coating is performed.

A positive electrode active material prepared according to the preparation method of the present invention includes a coating layer having a specific composition and uniformly formed, so that the structural stability of the positive electrode active material may be improved.

Accordingly, a secondary battery to which a positive electrode including the positive electrode active material according to the present invention is applied may have excellent charge/discharge efficiency, resistance stability, and cycle properties. Particularly, the charge/discharge efficiency and resistance stability at a high voltage may be excellent, and the cycle properties at a high temperature may be excellent.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
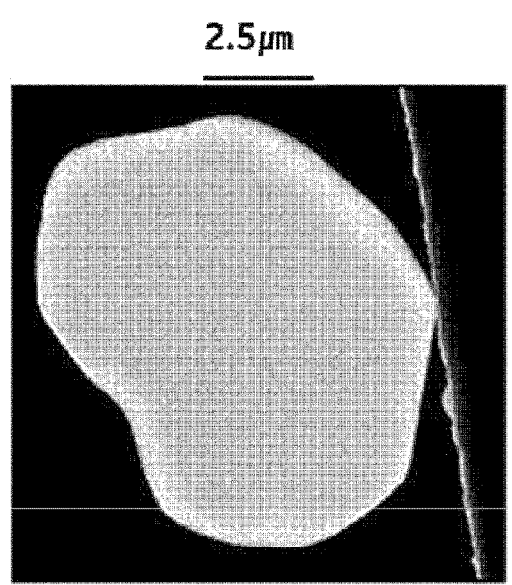
FIG. 1 and FIG. 2 are TEM-EDS elemental analysis images of a coating layer of the positive active material of Example 1.
Figure 1:
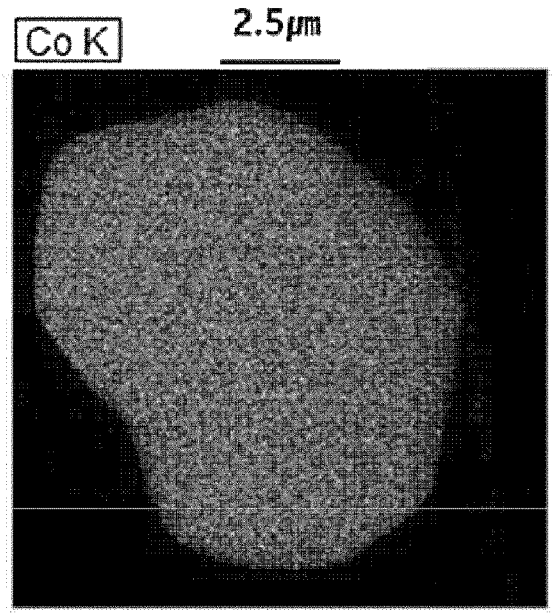
Figure 1:
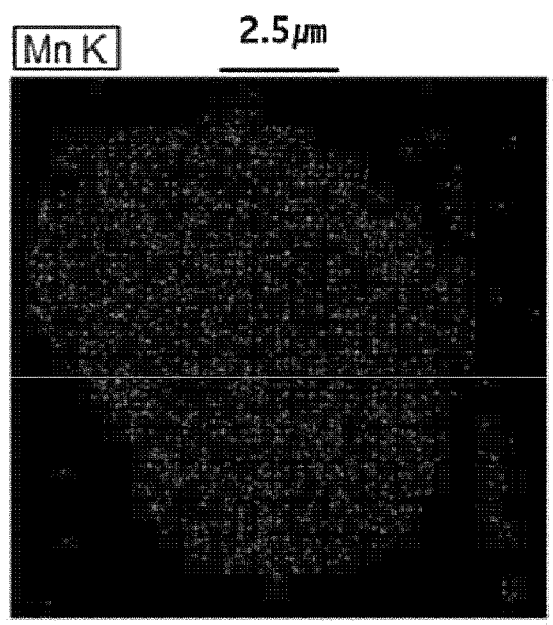
Figure 1:
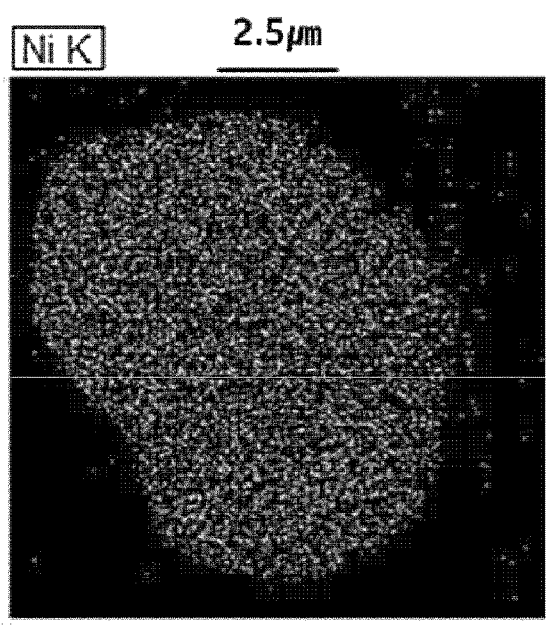

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

In the present specification, the term "on" includes not only a case in which a certain component is formed directly on an upper surface of another component, but also a case in which a third component is interposed therebetween.

In the present specification, $D_{50}$ may be defined as a particle diameter corresponding to 50% of the cumulative volume in the particle size distribution curve of particles. The $D_{50}$ be measured by, for example, a laser diffraction method. The laser diffraction method generally enables measurement of a particle diameter from a sub-micron region to several millimeters, so that results of high reproducibility and high resolution may be obtained.

Hereinafter, the present invention will be described in more detail.

<Method for Preparing Positive Electrode Active Material>

First, a method for preparing a positive electrode active material according to the present invention will be described.

The method for preparing a positive electrode active material according to the present invention includes a first step of reacting a coating precursor preparation solution including a metal solution containing metal ions included in a coating layer and a chelating agent to prepare a coating precursor, which is a complex in which the metal ions and the chelating agent are combined, and a second step of dry-mixing particles having the composition of Formula 1 or Formula 2 below and the coating precursor, followed by firing the mixture to form a coating layer having the composition of Formula 3 below on surfaces of the particles.

$$Li[Co_{1-a}M^1{}_a]O_2 \qquad \text{[Formula 1]}$$

In Formula 1 above, $M^1$ may be one or more selected from the group consisting of B, Mg, Ca, Al, Ti, V, Cr, Fe, Zn, Ga, Y, Zr, Nb, Mo, Ta, and W, and $0 \leq a < 0.1$.

$$Li[Ni_bCO_cMn_dM^2{}_e]O_2 \qquad \text{[Formula 2]}$$

In Formula 2 above, $M^2$ may be one or more selected from the group consisting of B, Mg, Ca, Al, Ti, V, Cr, Fe, Zn, Ga, Y, Zr, Nb, Mo, Ta, and W, and $0.8 \leq b < 1$, $0 < c < 0.2$, $0 < d < 0.2$, $0 \leq e < 0.1$, and $b+c+d+e=1$.

$$Li[Ni_fCo_gMn_hM^3{}_i]O_2 \qquad \text{[Formula 3]}$$

In Formula 3 above, $M^3$ may be one or more selected from the group consisting of B, Mg, Ca, Al, Ti, V, Cr, Fe, Zn, Ga, Y, Zr, Nb, Mo, Ta, and W, and $0 < f \leq 0.4$, $0 \leq g \leq 0.6$, $0 \leq h \leq 0.6$, $0 \leq i < 0.1$, and $f+g+h+i=1$.

The method for preparing a positive electrode active material according to the present invention is a method for preparing a positive electrode active material including particles having the composition of Formula 1 or Formula 2 above and a coating layer formed on the surfaces of the particles and having the composition of Formula 3 above.

Hereinafter, each step of the present invention will be described in detail.

(1) First Step

The first step is a step of reacting a coating precursor preparation solution including a metal solution containing metal ions included in a coating layer and a chelating agent to prepare a coating precursor, which is a complex in which the metal ions and the chelating agent are combined.

The coating precursor preparation solution includes a metal solution containing metal ions included in a coating layer and a chelating agent.

The metal solution containing metal ions included in a coating layer may be prepared by dissolving a metal-containing material such as a nickel-containing raw material, a cobalt-containing raw material, a manganese-containing raw material, a lithium-containing raw material, and the like in a solvent such as water.

At this time, the nickel-containing raw material may be an acetate, carbonate, nitrate, sulfate, halide, sulfide, oxide, or the like of nickel, and the cobalt-containing raw material may be an acetate, carbonate, nitrate, sulfate, halide, sulfide, oxide, or the like of cobalt. In addition, the manganese-containing raw material may be an acetate, carbonate, nitrate, sulfate, halide, sulfide, oxide, or the like of manganese, and the lithium-containing raw material may be an acetate, carbonate, nitrate, sulfate, halide, sulfide, oxide, or the like of lithium.

The nickel-containing raw material may be, for example, $Ni(CH_3COO)_2 \cdot 4H_2O$, $NiO$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a nickel halide, or a combination thereof, but is not limited thereto.

The cobalt-containing raw material may be, for example, $Co(CH_3COO)_2 \cdot 4H_2O$, $CoSO_4$, $Co(OCOCH_3)_2 \cdot 4H_2O$, $CO(NO_3)_2 \cdot 6H_2O$, $CoSO_4 \cdot 7H_2O$, or a combination thereof, but is not limited thereto.

The manganese-containing raw material may be, for example, $Mn(CH_3COO)_2 \cdot 4H_2O$, $Mn_2O_3$, $MnO_2$, $Mn_3O_4MnCO_3$, $Mn(NO_3)_2$, $MnSO_4$, manganese acetate, manganese halide, or a combination thereof, but is not limited thereto.

The lithium-containing raw material may be, for example, lithium carbonate, lithium hydroxide hydrate($LiOH \cdot H_2O$), lithium hydroxide, lithium nitrate($LiNO_3$), lithium chloride (LiCl), or a combination thereof, but is not limited thereto.

The metal solution may further contain an $M^3$ metal-containing raw material. At this time, the $M^3$ metal may be one or more selected from the group consisting of B, Mg, Ca, Al, Ti, V, Cr, Fe, Zn, Ga, Y, Zr, Nb, Mo, Ta, and W. At this time, the $M^3$ metal-containing raw material may be an acetate, carbonate, nitrate, sulfate, halide, sulfide, oxide, or the like of the $M^3$ metal.

Meanwhile, the content of each of the nickel-containing raw material, the cobalt-containing raw material, the manganese-containing raw material, the lithium-containing raw material, and the $M^3$ metal-containing raw material may be adjusted such that the composition of a coating layer prepared using the metal solution satisfies the composition of Formula 3 above.

The chelating agent may be a Lewis acid compound including one or more selected from the group consisting of a carboxylic acid group and a nitrogen element. In the case of the carboxylic acid group, anions of carboxylate formed by the oxidation of the carboxylic acid group in a coating precursor preparation solution may form a complex with metal ions, and in the case of the nitrogen element, unshared electrons pairs of the nitrogen element may form a complex with metal ions.

The chelating agent may preferably be one or more selected from the group consisting of citric acid, polyvinylpyrrolidone, and glycolic acid, and more preferably, may be citric acid and/or polyvinylpyrrolidone. In this case, forming a complex with metal ion may be facilitated.

The coating precursor preparation solution may be prepared by adding the metal solution containing ions included in a coating layer and the chelating agent to a solvent, followed by mixing. The solvent of the coating precursor preparation solution may be one or more selected from the group consisting of ethylene glycol, diethylene glycol, triethylene glycol, 1,2-propylene glycol, 1,3-propylene glycol 1,2-butanediol, 1,3-butanediol, 1,4-butanediol, and 2,3-butanediol. The solvent of the coating precursor preparation solution may preferably be diethylene glycol and/or triethylene glycol.

When the coating precursor preparation solution including the metal solution containing metal ions and the chelating agent is prepared, the coating precursor preparation solution is reacted at a high temperature while being refluxed to obtain a solution including a complex formed by coordinating the metal ions and the chelating agent. Thereafter, the solution including a complex is washed with ethanol using a centrifugal separator to separate only the complex, and then the separated complex is dried to obtain a coating precursor.

The reaction of the first step may be performed at 200° C. to 300° C., preferably 200° C. to 250° C. Specifically, the coating precursor preparation solution may be reacted at 200° C. to 300° C., preferably 200° C. to 250° C., while being refluxed for 1 to 5 hours. When the reaction is performed at a temperature within the above range, the formation of a complex may be facilitated.

Meanwhile, when a metal solution includes Ni, Co, Mn, Li ions, and the like, when a coating precursor preparation solution including the metal solution and a chelating agent is reacted, the Ni and Co ions are reduced and aggregated to form a cluster, and the Mn and Li ions are present around the cluster. Accordingly, after the reaction is terminated, when a product is washed using a centrifugal separator and then dried, a coating precursor in which Ni and Co are present in a core portion and Mn, Li, the chelating agent are combined and present in an upper portion of the core portion is obtained. At this time, the molar ratio of the Ni, Co, and Mn which are present in the coating precursor may be adjusted such that the composition of a coating layer prepared using the coating precursor satisfies the composition of Formula 3 above. For example, the molar ratio of Ni:Co:Mn may be 4:2:4.

The coating precursor prepared as described above may have an average particle diameter ($D_{50}$) of 1 nm to 500 nm. The average particle diameter ($D_{50}$) of the coating precursor may be, preferably 5 nm to 300 nm, and more preferably 10 nm to 150 nm. When the average particle diameter ($D_{50}$) of the coating precursor is within the above range, the uniformity of surface coating may be excellent.

(2) Second Step

The second step is a step of dry-mixing the coating precursor prepared through the first step and particles having the composition of Formula 1 or Formula 2 above, followed by firing the mixture to form a coating layer having the composition of Formula 3 above on surfaces of the particles.

According to the preparation method of the present invention, by using a coating precursor which is a nano-sized complex in which metal ions and a chelating agent are combined, it is possible to uniformly form a coating layer even when drying coating is performed.

Specifically, according to the preparation method of the present invention, the surfaces of the particles having the composition of Formula 1 or Formula 2 above may be completely surrounded by the coating layer. That is, the surfaces of the particles may not be exposed to the outside.

The particles having the composition of Formula 1 or Formula 2 above are lithium-cobalt-based transition metal oxide particles or lithium-nickel-based transition metal oxide particles having a high nickel content, and may be prepared by a method commonly known in the art.

For example, when the composition of particles having the composition of Formula 1 above is $LiCoO_2$, the $LiCoO_2$ particles may be prepared by firing a dry mixture at 900° C. to 1100° C., the dry mixture of $Li_2CO_3$ and $Co_3O_4$ mixed such that the molar ratio of Li:Co is 1:1.

In the second step, the firing may be performed at 800° C. to 900° C. The firing may be performed for 5 hours to 15 hours. In this case, the diffusion between particles may be improved, so that a uniform coating layer may be formed.

Specifically, the firing may performed after raising the temperature to 800° C. to 900° C. at a rate of 5° C./min to 10° C./min. The firing may be performed for 5 hours to 15 hours. When the temperature is raised to a firing temperature at once while maintaining a constant temperature raising rate, a coating precursor is independently fired so that independent particles are not formed, and a coating layer may be uniformly formed on surfaces of particles having the composition of Formula 1 or Formula 2.

Through the above method, it is possible to uniformly form a coating layer having a specific composition even when drying coating is performed, so that it is possible to prepare a positive electrode active material with improved structural stability.

Positive Electrode Active Material

Next, a positive electrode active material according to the present invention will be described.

The positive electrode active material according to the present invention includes particles having the composition of Formula 1 or Formula 2 below and a coating layer formed on surfaces of the particles and having the composition of Formula 3 below.

$$Li[Co_{1-a}M^1_a]O_2 \quad \text{[Formula 1]}$$

In Formula 1, $M^1$ is one or more selected from the group consisting of B, Mg, Ca, Al, Ti, V, Cr, Fe, Zn, Ga, Y, Zr, Nb, Mo, Ta, and W, and $0 \leq a < 0.1$.

$$Li[Ni_b Co_c Mn_d M^2_e]O_2 \quad \text{[Formula 2]}$$

In Formula 2 above, $M^2$ is one or more selected from the group consisting of B, Mg, Ca, Al, Ti, V, Cr, Fe, Zn, Ga, Y, Zr, Nb, Mo, Ta, and W, and $0.8 \leq b < 1$, $0 < c < 0.2$, $0 < d < 0.2$, $0 \leq e < 0.1$, and $b+c+d+e=1$.

$$Li[Ni_f Co_g Mn_h M^3_i]O_2 \quad \text{[Formula 3]}$$

In Formula 3 above, $M^3$ may be one or more selected from the group consisting of B, Mg, Ca, Al, Ti, V, Cr, Fe, Zn, Ga, Y, Zr, Nb, Mo, Ta, and W, and $0 < f \leq 0.4$, $0 \leq g \leq 0.6$, $0 \leq h \leq 0.6$, $0 \leq i < 0.1$, and $f+g+h+i=1$.

That is, the present invention provides a positive electrode active material including lithium-cobalt-based transition metal oxide particles or lithium-nickel-based transition metal oxide particles having a high nickel content and a coating layer formed on upper portions of the particles and having a specific composition.

The positive electrode active material of the present invention includes a coating layer having a specific composition and uniformly formed, so that the structural stability of the positive electrode active material may be improved. Accordingly, a secondary battery to which a positive electrode including the positive electrode active material according to the present invention is applied may have excellent charge/discharge efficiency, resistance stability, and cycle properties. Particularly, the charge/discharge efficiency and resistance stability at a high voltage may be excellent, and the cycle properties at a high temperature may be excellent.

The surfaces of the particles having the composition of Formula 1 or Formula 2 above may be completely surrounded by the coating layer. That is, the surfaces of the particles may not be exposed to the outside. In this case, it is possible to prevent side reactions which may occur when the surfaces of the particles comes in contact with an electrolyte solution, and thus, the safety of the positive electrode active material may be further improved.

The thickness of the coating layer may be 1 nm to 500 nm. The thickness of the coating layer may be, preferably 10 nm to 200 nm, and more preferably 20 nm to 50 nm. When the thickness of the coating layer is in the above range, the coating layer may not act as a resistor, and the uniformity of surface coating may be excellent.

Positive Electrode

Next, a positive electrode including the above-described positive electrode active material of the present invention will be described.

The positive electrode includes a positive electrode current collector and a positive electrode active material layer formed on the positive electrode current collector, wherein the positive electrode active material layer includes the positive electrode active material according to the present invention.

Since the positive electrode active material has been described above, a detailed description thereof will be omitted. Hereinafter, only the rest of the components will be described in detail.

The positive electrode current collector may include a metal having a high conductivity, and is not particularly limited as long as the positive electrode current collector is not reactive in the voltage range of a battery while a positive electrode active material layer is able to be easily adhered thereto. For example, as the positive electrode current collector, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 to 500 μm, and microscopic irregularities may be formed on the surface of the current collector to improve the adhesion of a positive electrode active material. For example, the positive electrode current collector may be used in various forms such as a film, a sheet, a foil, a net, a porous body, a foam, and a non-woven body.

The positive electrode active material layer may selectively include, if necessary, a conductive material and a binder, together with the positive electrode active material.

At this time, the positive electrode active material may be included in an amount of 80-99 wt %, and more specifically, 85-98.5 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive tube such as a carbon nanotube; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 0.1 to 15 wt % based on the total weight of the positive electrode active material layer.

The binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, polymethymethaxrylate, carboxymethyl cellulose (CMC), starch, hydroxypropyl cellulose, regenerated cellulose, polyvinylpyrrolidone, tetrafluoroethylene, polyethylene, polypropylene, an ethylenepropylene-diene monomer (EPDM), a sulfonated EPDM, styrene-butadiene rubber (SBR), fluorine rubber, a poly acrylic acid, a polymer having the hydrogen thereof substituted with Li, Na, or Ca, or various copolymers thereof, and any one thereof or a mixture of two or more thereof may be used. The binder may be included in an amount of 0.1 to 15 wt % based on the total weight of the positive electrode active material layer.

The positive electrode may be manufactured according to a typical method for manufacturing a positive electrode except that the positive electrode active material described above is used. Specifically, the positive electrode may be manufactured by applying a composition for forming a positive electrode active material layer, which is prepared by dissolving or dispersing the positive electrode active material described above and selectively, if necessary, a binder, a conductive material, and a dispersant in a solvent, on a positive electrode current collector, followed by drying and roll-pressing.

The solvent may be a solvent commonly used in the art, and may be dimethyl sulfoxide (DMSO), isopropyl alcohol, N-methylpyrrolidone (NMP), dimethyl formamide (DMF), acetone, water, or the like, and any one thereof or a mixture of two or more thereof may be used. The amount of the solvent to be used is sufficient if the solvent may dissolve and disperse the positive electrode active material, the binder, the conductive material, and the dispersant in consideration of the applying thickness of a slurry and preparation yield, and thereafter, have a viscosity which may exhibit excellent thickness uniformity during application for manufacturing a positive electrode.

In addition, in another method, the positive electrode may be manufactured by casting the composition for forming a positive electrode active material layer on a separate support and then laminating a film obtained by being peeled off from the support on a positive electrode current collector.

Electrochemical Device

Next, an electrochemical device including the positive electrode described above will be described.

The electrochemical device may specifically be a battery, a capacitor, or the like, and more specifically, a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO\beta(0<\beta<2)$, $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, mesocarbon microbeads, mesophase pitches, and high-temperature sintered carbon such as petroleum or coal tar pitch derived cokes.

The negative electrode active material may be included in an amount of 80 wt % to 99 wt % based on the total weight of the negative electrode active material layer.

The binder is a component for assisting in bonding between a conductive material, an active material, and a current collector, and is typically added in an amount of 0.1 wt % to 10 wt % based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 wt % or less, specifically 5 wt % or less, based on the total weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The negative electrode active material layer may be prepared by applying a composition for forming a negative electrode active material layer, which is prepared by dissolving or dispersing a negative electrode active material and selectively a binder and a conductive material in a solvent, on a negative electrode current collector, following by drying. Alternatively, the negative electrode active material layer may be prepared by casting the composition for forming a negative electrode active material on a separate support, and then laminating a film peeled off from the support on a negative electrode current collector.

As an example, the negative electrode active material layer may be prepared by applying a composition for forming a negative electrode active material layer, which is prepared by dissolving or dispersing a negative electrode active material and selectively a binder and a conductive material in a solvent, on a negative electrode current collector, following by drying, or may be prepared by casting the composition for forming a negative electrode active material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte solution as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte solution may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, anions of the lithium salt may be at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, and as the lithium salt $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, LiB$(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1 to 5 wt % based on the total weight of the electrolyte.

The lithium secondary battery including the positive electrode active material according to the present invention as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, a battery module including the lithium secondary battery as a unit cell, and a battery pack including the battery module may be provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), and a system for storing power.

The external shape of the lithium secondary battery is not particularly limited, but may be a cylindrical shape using a can, a square shape, a pouch shape, a coin shape, and the like.

The lithium secondary battery may be used in a battery cell which is used as a power source for a small-sized device, and may also be preferably used as a unit cell for a medium- and large-sized battery module including a plurality of battery cells.

Examples of the medium- and large-sized device include electric vehicles, hybrid electric vehicles, plug-in hybrid electric vehicles, and electric power storage systems, but are not limited thereto.

Hereinafter, the present invention will be described in more detail with reference to specific examples.

EXAMPLES AND COMPARATIVE EXAMPLES

Example 1

A transition metal acetate aqueous solution in which 0.012 mol of $Ni(CH_3COO)_2 \cdot 4H_2O$, 0.006 mol of $Co(CH_3COO)_2 \cdot 4H_2O$, and 0.012 mol of $Mn(CH_3COO)_2 \cdot 4H_2O$ are mixed, 0.0345 mol of $LiOH \cdot H_2O$, and 0.045 mol of citric acid which is a chelating agent were added to 80 ml of triethylene glycol which is a solvent and then mixed. Thereafter, the mixture was reacted while being refluxed at 230° C. for 3 hours to obtain a solution including a complex in which Ni, Co, Mn, Li and the chelating agent were combined. The solution including a complex was washed with ethanol using a centrifugal separator to separate only the complex, and then the separated complex was dried at 80° C. to obtain a coating precursor having an average particle diameter ($D_{50}$) of 100 nm.

$LiCoO_2$ (Sigma Aldrich Co. Ltd.) and the coating precursor were dry-mixed, and then the temperature was raised from 25° C. to 850° C. at a temperature raising rate of 5° C./min. The mixture was fired at 850° C. for 10 hours to prepare a positive electrode active material having a coating layer with the composition of $LiNi_{0.4}Co_{0.2}Mn_{0.4}$ formed on the surface of the lithium cobalt oxide ($LiCoO_2$) particles. The thickness of the coating layer was 40 nm.

Comparative Example 1

The lithium cobalt oxide ($LiCoO_2$) prepared in Example 1 was used as a positive electrode active material.

EXPERIMENTAL EXAMPLES

Experimental Example 1

Elemental analysis was performed on the coating layer of the positive active material of Example 1 using TEM-EDS (JEOL Co. Ltd.), and the results are shown in FIG. 1 and FIG. 2.

Referring to FIG. 1, it can be confirmed that Ni, Co, and Mn elements are each distributed and present in the entire coating layer of the positive electrode active material of Example 1.

Figure 2:
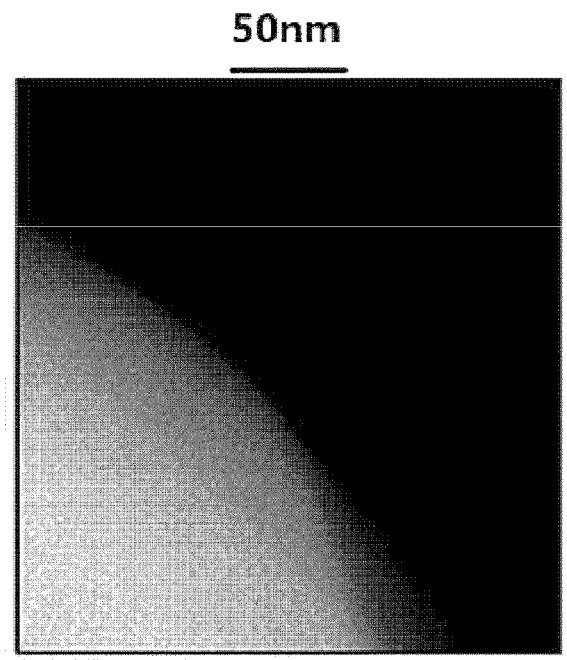
Figure 2:
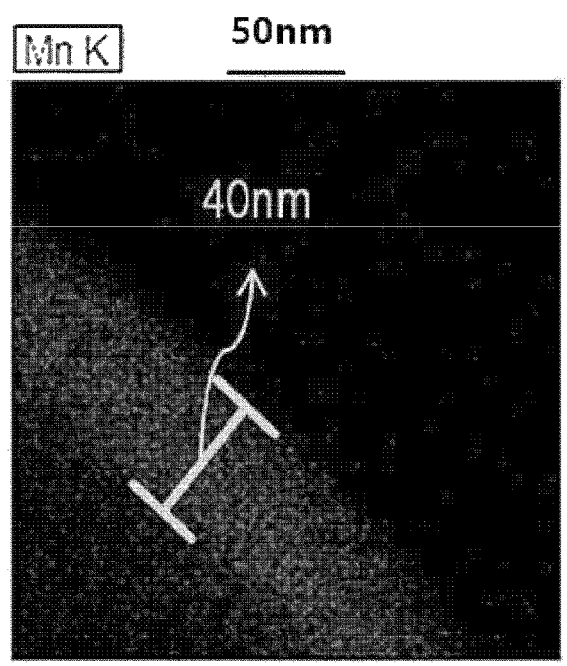

Referring to FIG. 2, the thickness of the coating layer of the positive electrode active material of Example 1 is 40 nm.

Experimental Example 2

The positive electrode active material of each of Example 1 and Comparative Example 1 were used, and PVdF was used as a binder and natural graphite was used as a conductive material. The positive electrode active material, the binder, and the conductive material were mixed well in NMP at a weight ratio of 96:2:2, and then the mixture was coated on an Al foil having a thickness of 20 μm and dried at 130° C. to prepare positive electrodes. A lithium foil was used as a negative electrode and an electrolyte solution containing 1 M of $LiPF_6$ in a solvent of EC:DMC:DEC=1:2:1 was used to manufacture a half-coin cell.

(1) Identifying whether the Coating Layer of the Present Invention is a Resistor The half-coin cell manufactured above was charged to an upper limit voltage of 4.3 V with 0.2 C and discharged to a lower limit voltage of 3.0 V with 0.2 C at 25° C. to measure a voltage profile. The measurement results are shown in FIG. 3.

In addition, the half-coin cell manufactured above was charged to an upper limit voltage of 4.5 V with 0.2 C and discharged to a lower limit voltage of 3.0 V with 0.2 C at 25° C. to measure a voltage profile. The measurement results are shown in FIG. 4.

Figure 3:
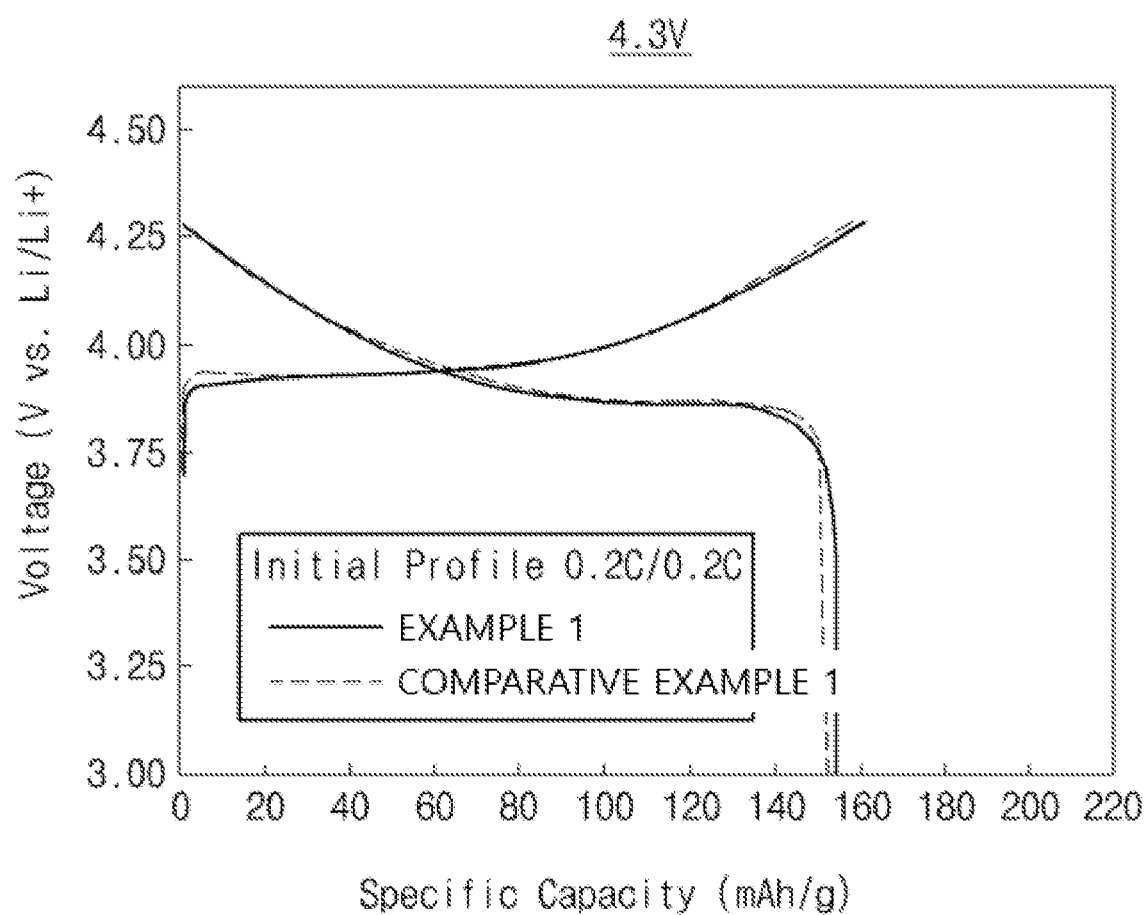
FIG. 3 to FIG. 8 are graphs showing the voltage profile of a battery including the positive active material of each of Example 1 and Comparative Example 1.
Figure 4:
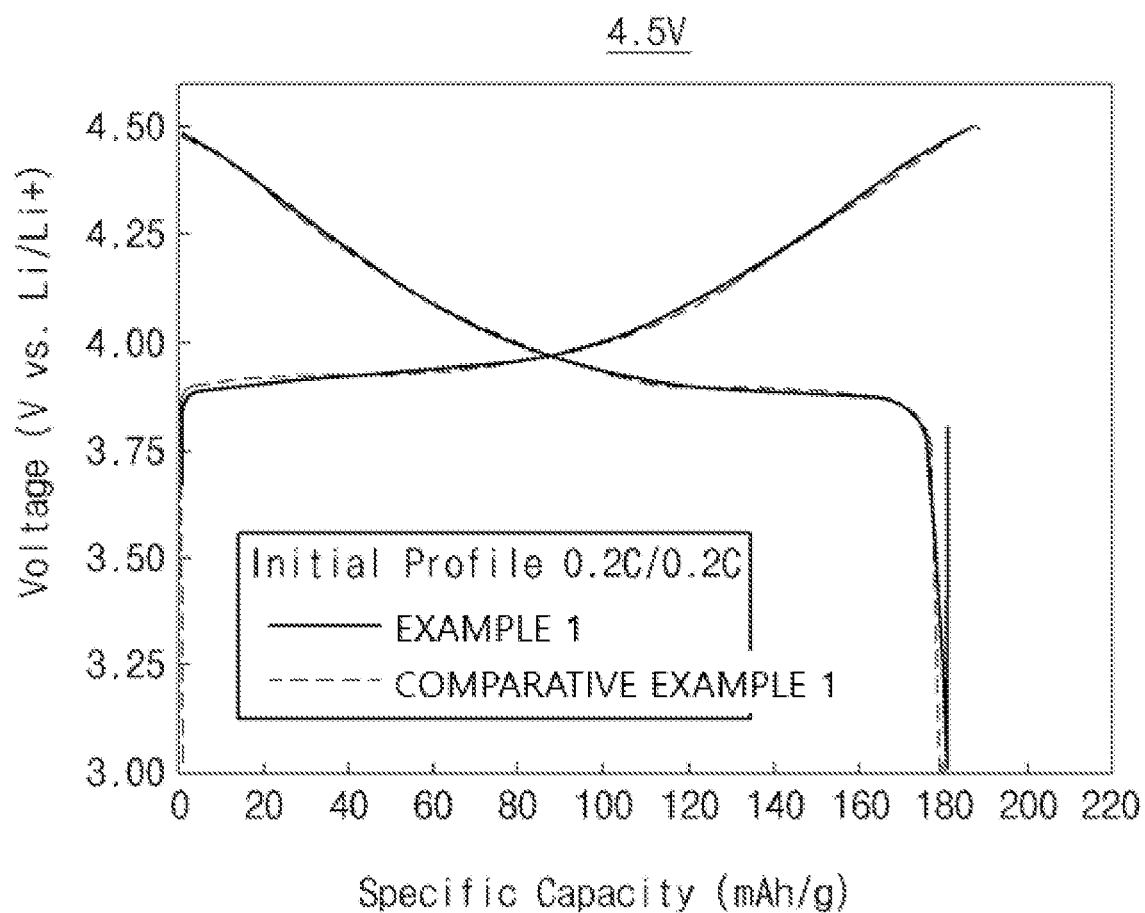

Referring to FIG. 3 and FIG. 4, it can be confirmed that there is no big difference between the voltage profile of the half-coin cell including the positive electrode active material of Example 1 and the voltage profile of the half-coin cell including the positive electrode active material of Comparative Example 1 and that the coating layer of the positive electrode active material of Example 1 is not a resistor. This is because the coating layer has a layered crystal structure and the composition of $LiNi_{0.4}Co_{0.2}Mn_{0.4}$.

(2) Evaluation of Charge/Discharge Efficiency and Resistance Stability

Figure 5:
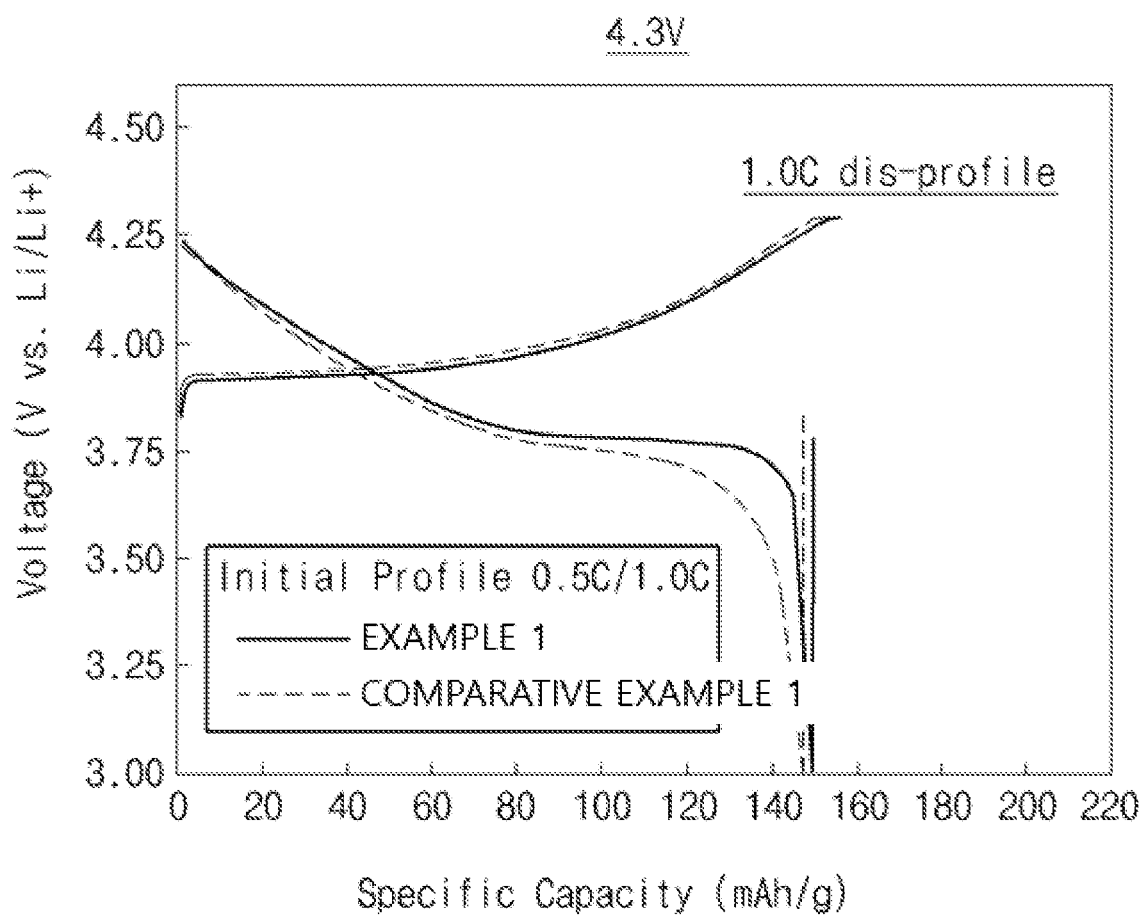

The half-coin cell manufactured above was charged to an upper limit voltage of 4.3 V with 0.5 C and discharged to a lower limit voltage of 3.0 V with 1.0 C at 25° C. to measure a voltage profile. The measurement results are shown in FIG. 5.

Figure 6:
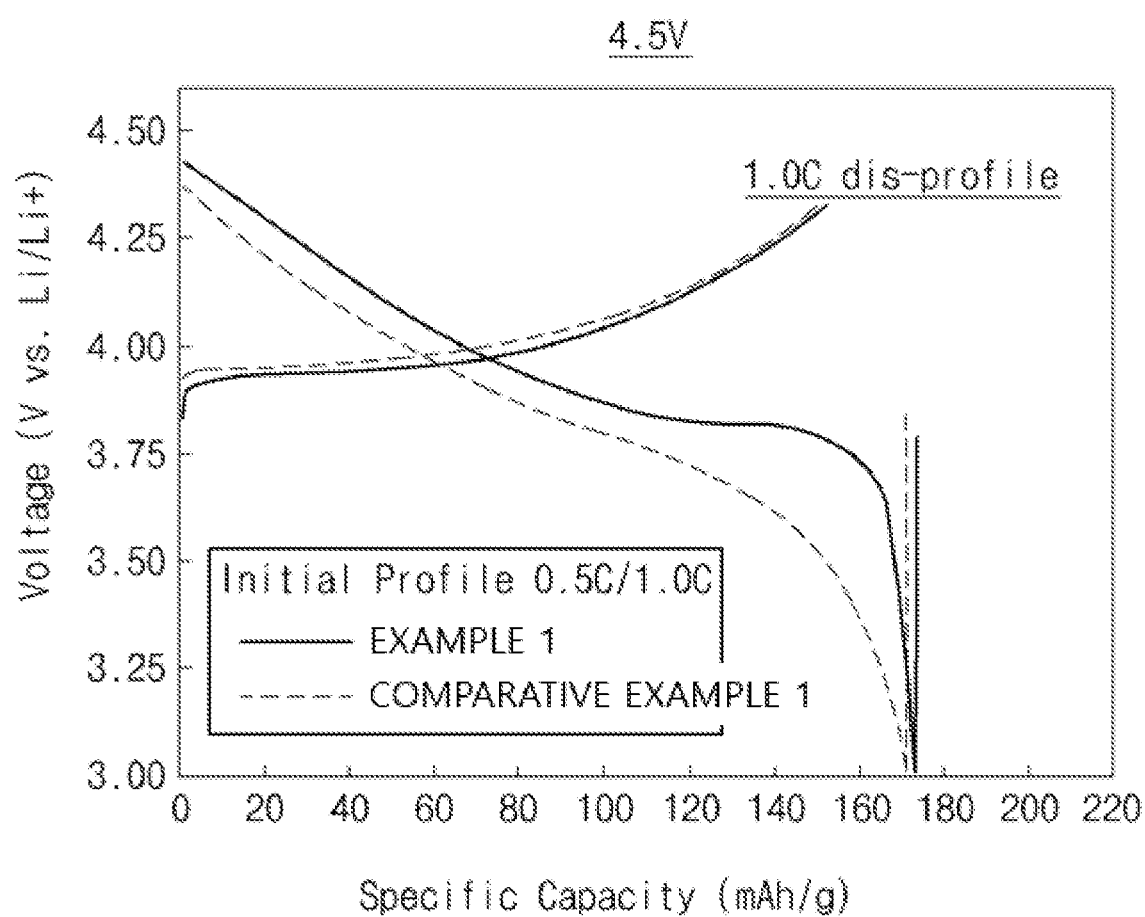

In addition, the half-coin cell manufactured above was charged to an upper limit voltage of 4.5 V with 0.5 C and discharged to a lower limit voltage of 3.0 V with 1.0 C at 25° C. to measure a voltage profile. The measurement results are shown in FIG. 6.

Also, the half-coin cell manufactured above was charged to an upper limit voltage of 4.3 V with 0.5 C and discharged to a lower limit voltage of 3.0 V with 2.0 C at 25° C. to measure a voltage profile. The measurement results are shown in FIG. 7.

Lastly, the half-coin cell manufactured above was charged to an upper limit voltage of 4.5 V with 0.5 C and discharged to a lower limit voltage of 3.0 V with 2.0 C at 25° C. to measure a voltage profile. The measurement results are shown in FIG. 8.

Figure 7:
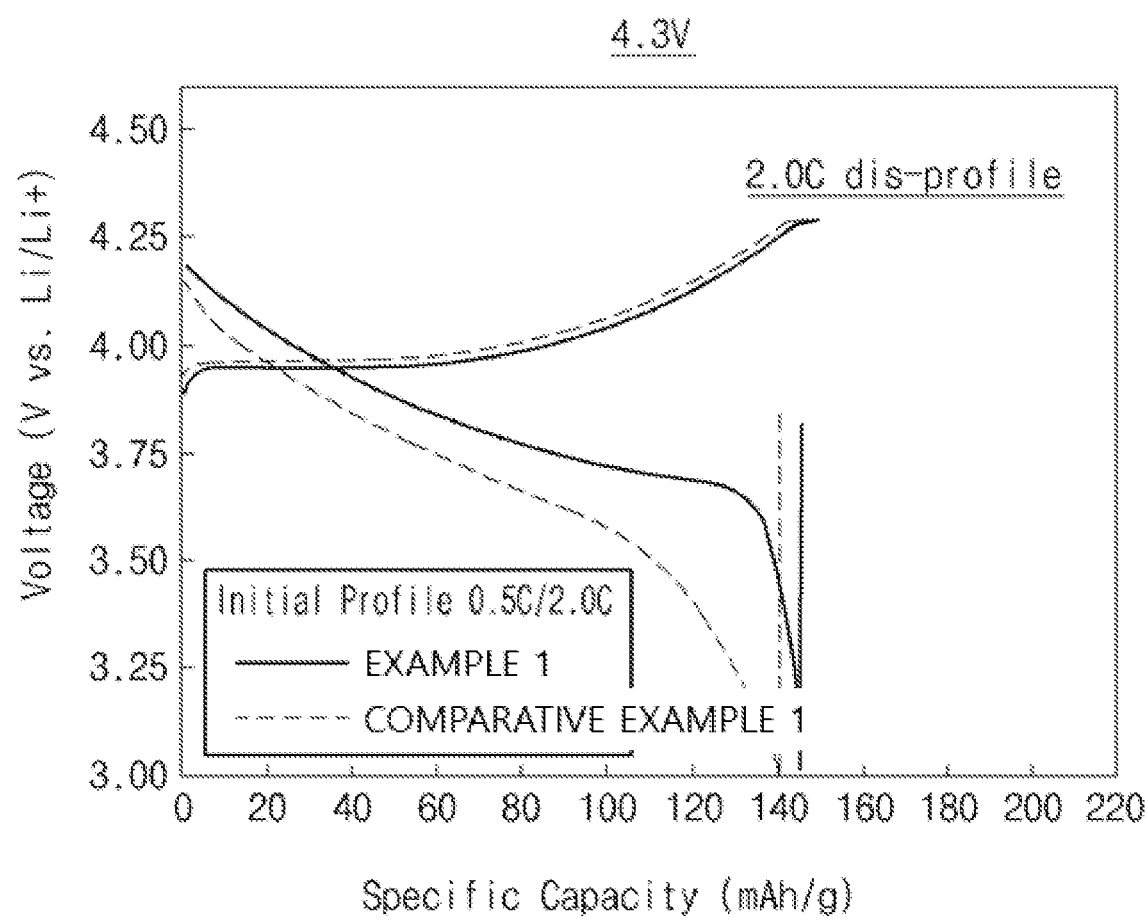

Referring to FIG. 5 and FIG. 7 which are voltage profiles when the upper limit voltage is 4.3 V, in the case of the half-coin cell including the positive electrode active material of Example 1, it can be confirmed that the graph slope thereof is larger than that of the half-coin cell including the positive electrode active material of Comparative Example 1 at the beginning of the discharge. From the above, it can be confirmed that a battery including the positive electrode active material according to the present invention is excellent in resistance stability at a high voltage.

Figure 8:
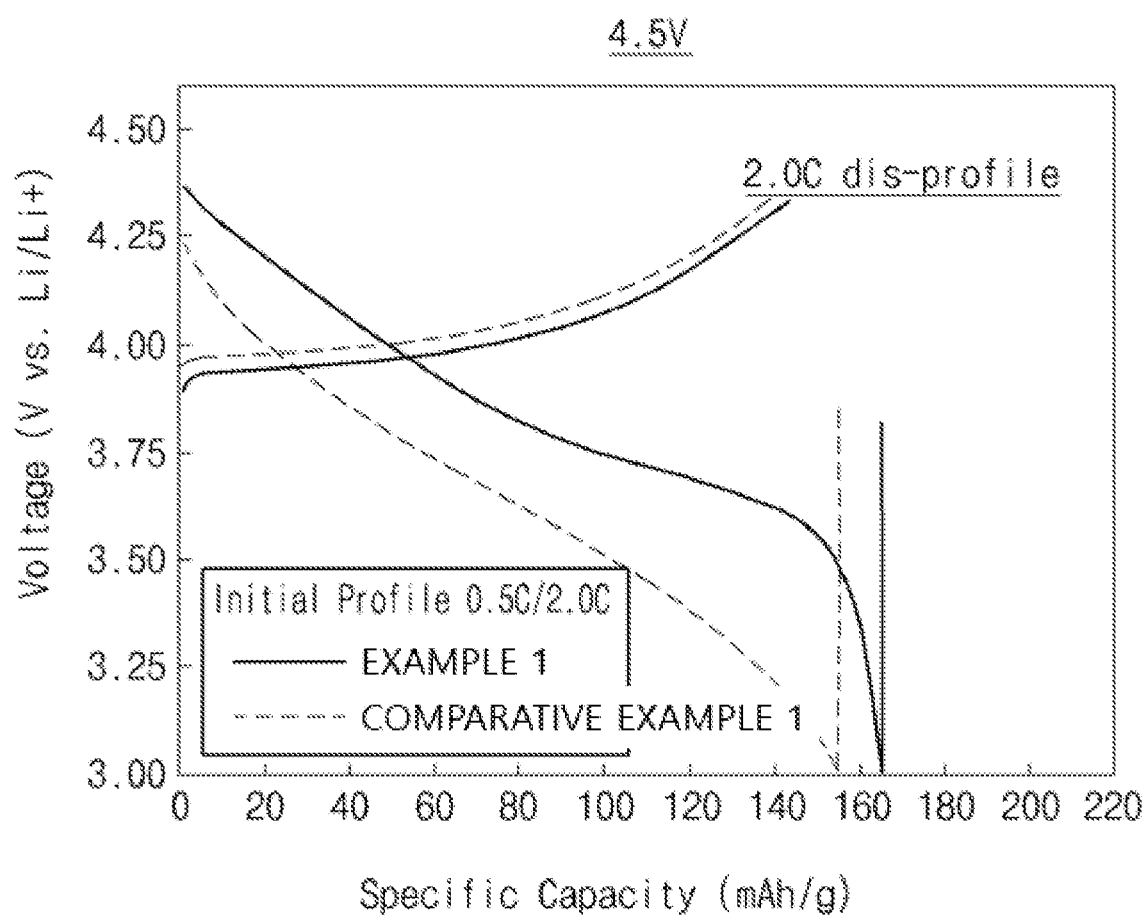

Referring to FIG. 6 and FIG. 8 which are voltage profiles when the upper limit voltage is 4.5 V, in the case of the half-coin cell including the positive electrode active material of Example 1, it can be confirmed that the graph slope thereof is significantly larger than that of the half-coin cell including the positive electrode active material of Comparative Example 1 at the beginning of the discharge. From the above, it can be confirmed that a battery including the positive electrode active material according to the present invention is significantly excellent in resistance stability at a high voltage. In addition, from the fact that the y-intercept value of the half-coin cell including the positive electrode active material of Example 1 is large, it can be confirmed that a battery including the positive electrode active material according to the present invention is excellent in charge/discharge efficiency at a high voltage.

This is because, while the positive electrode active material of Comparative Example 1 had problems in that not only the oxidation number of cobalt became from +3 to +4 as lithium was delithiated, but also the oxygen stability of the surface was low due to a competitive reaction of oxygen in the structure of the positive electrode active material structure, thereby collapsing the structure, the positive electrode active material prepared according to the preparation method of the present invention included a coating layer having a specific composition and uniformly formed, so that the structural stability of the positive electrode active material was improved.

(3) Evaluation of Capacity Retention Rate

The half-coin cells prepared above were charged to an upper limit voltage of 4.5 V with 0.5 C at 45° C., and then maintained in a rest state for 20 minutes, and discharged to a lower limit voltage of 3.0 V with 1.0 C, and then maintained in a rest state for 20 minutes, and the whole process was set as one cycle. While repeating the cycle for times, capacity retention rates in the first to the thirtieth cycles were respectively measured, and the results are shown in FIG. 9 below.

Figure 9:
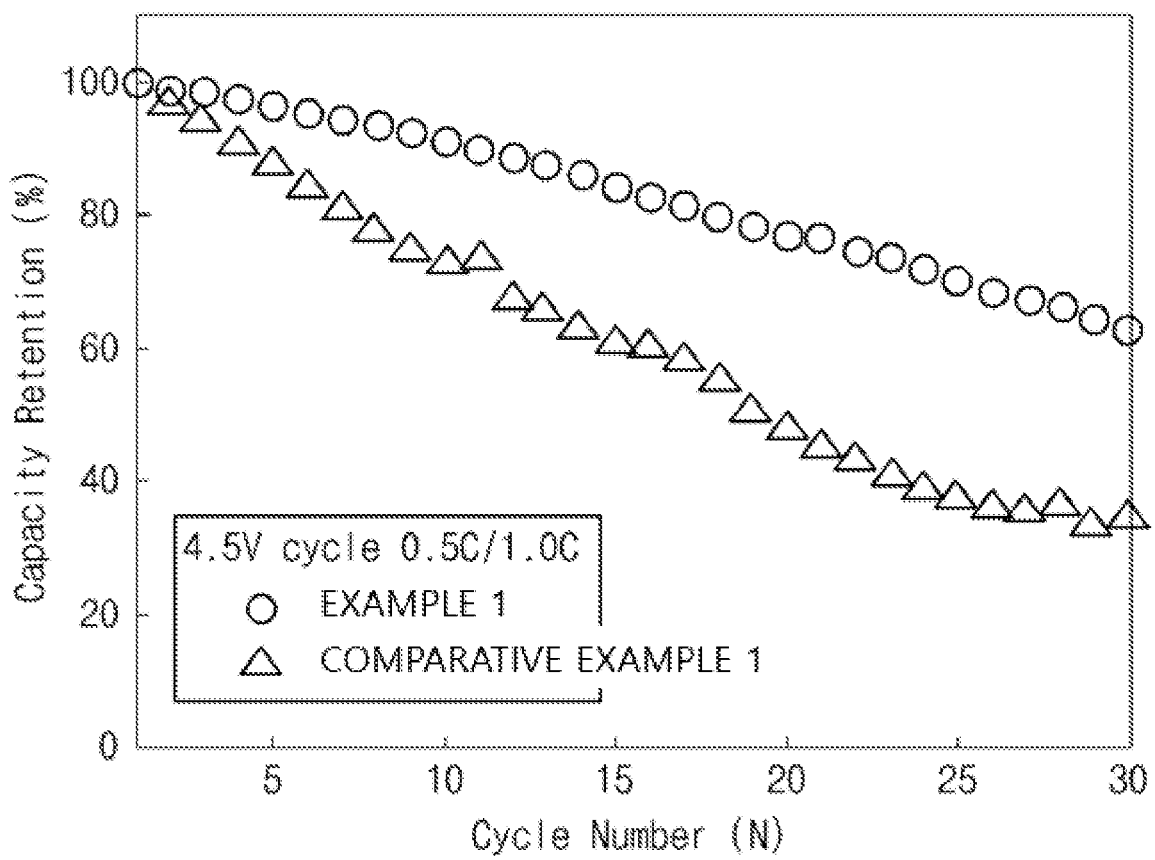
FIG. 9 is a graph showing a capacity retention rate according to a cycle of a battery including the positive active material of each of Example 1 and Comparative Example 1.

Referring to FIG. 9, in the case of the half-coin cell including the positive electrode active material of Example 1, it can be confirmed that the capacity retention rate thereof is significantly excellent than that of the half-coin cell including the positive electrode active material of Comparative Example 1. From the above, it can be confirmed that a battery including the positive electrode active material according to the present invention is excellent in cycle properties under high voltage of 4.5 V and high temperature conditions. This is also because that the positive electrode active material of the present invention includes a coating layer having a specific composition and uniformly formed, so that the structural stability of the positive electrode active material may be improved.

The invention claimed is:

1. A positive electrode active material comprising:
   particles having the composition of Formula 1 below; and
   a coating layer formed on surfaces of the particles and having the composition of Formula 3 below:

   [Formula 1]

wherein, in Formula 1 above,
   $M^1$ is one or more selected from the group consisting of B, Mg, Ca, Al, Ti, V, Cr, Fe, Zn, Ga, Y, Zr, Nb, Mo, Ta, and W, and $0 \leq a < 0.1$,

   [Formula 3]

wherein, in Formula 3 above,
   $M^3$ is one or more selected from the group consisting of B, Ca, V, Cr, Fe, Zn, Ga, Y, Nb, Mo, and Ta, and $0 < f \leq 0.4$, $0 \leq g \leq 0.6$, $0 \leq h \leq 0.6$, $0 \leq i < 0.1$, and $f+g+h+i=1$,
   wherein the thickness of the coating layer is 1 nm to 500 nm.

2. The positive electrode active material of claim 1, wherein the surfaces of the particles are completely surrounded by the coating layer.

3. The positive electrode active material of claim 1, wherein the thickness of the coating layer is 1 nm to 200 nm.

4. A positive electrode for a lithium secondary battery, the positive electrode comprising the positive electrode active material according to claim 1.

5. A lithium secondary battery comprising the positive electrode for a lithium secondary battery according to claim 4.

6. The positive electrode active material of claim 1, wherein the coating layer consists of the composition of Formula 3.

7. A method for preparing the positive electrode active material of claim 1, comprising:
   reacting a coating precursor preparation solution comprising a metal solution containing metal ions and a chelating agent to prepare a coating precursor, wherein the coating precursor is a complex in which the metal ions and the chelating agent are combined; and
   dry-mixing particles having the composition of Formula 1 below and the coating precursor to obtain a mixture, followed by firing the mixture to form a coating layer having the composition of Formula 3 below on surfaces of the particles:

   [Formula 1]

wherein, in Formula 1 above,
   $M^1$ is one or more selected from the group consisting of B, Mg, Ca, Al, Ti, V, Cr, Fe, Zn, Ga, Y, Zr, Nb, Mo, Ta, and W, and $0 \leq a < 0.1$,

   [Formula 3]

wherein, in Formula 3 above, $M^3$ is one or more selected from the group consisting of B, Mg, Ca, Al, Ti, V, Cr, Fe, Zn, Ga, Y, Zr, Nb, Mo, Ta, and W, and $0 < f \leq 0.4$, $0 \leq g \leq 0.6$, $0 \leq h \leq 0.6$, $0 \leq i < 0.1$, and $f+g+h+i=1$, and
   wherein the thickness of the coating layer is 1 nm to 500 nm.

8. The method of claim 7, wherein the chelating agent is a Lewis acid compound including a carboxylic acid group or a nitrogen element.

9. The method of claim 8, wherein the chelating agent is one or more selected from the group consisting of citric acid, polyvinylpyrrolidone, and glycolic acid.

10. The method of claim 7, wherein the coating precursor preparation solution is prepared by adding the metal solution containing ions and the chelating agent to a solvent, followed by mixing.

11. The method of claim 10, wherein the solvent is one or more selected from the group consisting of ethylene glycol, diethylene glycol, triethylene glycol, 1,2-propylene glycol, 1,3-propylene glycol 1,2-butanediol, 1,3-butanediol, 1,4-butanediol, and 2,3-butanediol.

12. The method of claim 7, wherein the average particle diameter ($D_{50}$) of the coating precursor is 1 nm to 500 nm.

13. The method of claim 7, wherein the reacting the coating precursor preparation solution is performed at 200° C. to 300° C.

14. The method of claim 7, wherein the firing is performed at a temperature 800° C. to 900° C.

15. The method of claim 14, wherein the firing is performed after raising the temperature to 800° C. to 900° C. at a rate of 5° C./min to 10° C./min.

* * * * *